US005536480A

United States Patent [19]
Simmons

[11] Patent Number: 5,536,480
[45] Date of Patent: Jul. 16, 1996

[54] METHOD FOR TREATING MINERAL MATERIAL HAVING ORGANIC CARBON TO FACILITATE RECOVERY OF GOLD AND SILVER

[75] Inventor: Gary L. Simmons, Albuquerque, N.M.

[73] Assignee: Santa Fe Pacific Gold Corporation, Albuquerque, N.M.

[21] Appl. No.: 346,404

[22] Filed: Nov. 29, 1994

[51] Int. Cl.$^6$ ........................................ C22B 11/00
[52] U.S. Cl. .................... 423/28; 423/30; 423/41
[58] Field of Search .................... 423/28, 30, 41

[56] References Cited

U.S. PATENT DOCUMENTS

| | | | |
|---|---|---|---|
| 2,777,764 | 1/1957 | Hedley et al. | 75/105 |
| 4,289,532 | 9/1981 | Matson et al. | 75/105 |
| 4,405,569 | 9/1983 | Dienstbach | 423/27 |
| 4,552,589 | 11/1985 | Mason et al. | 75/105 |
| 4,571,263 | 2/1986 | Weir et al. | 75/101 |
| 4,571,264 | 2/1986 | Weir et al. | 75/101 |
| 4,578,163 | 3/1986 | Kunter et al. | 204/110 |
| 4,632,701 | 12/1986 | Genik-Sas-Berezowsky et al. | 423/30 |
| 4,731,114 | 3/1988 | Ramadorai et al. | 75/118 |
| 4,738,718 | 4/1988 | Bakshani et al. | 423/30 |
| 4,923,510 | 5/1990 | Ramadorai et al. | 423/29 |
| 4,941,917 | 7/1990 | Cenegy et al. | 75/744 |
| 4,979,986 | 12/1990 | Hill et al. | 75/711 |
| 4,979,987 | 12/1990 | Mason et al. | 75/744 |
| 5,071,477 | 12/1991 | Thomas et al. | 75/744 |
| 5,232,491 | 8/1993 | Corrans et al. | 75/743 |

OTHER PUBLICATIONS

Jha, C., "Refractoriness of Certain Gold Ores to Cyanidation: Probable Causes and Possible Solutions," Mineral Processing and Extractive Metallurgy Review, vol. 2, pp. 331–352, Gordon and Breach, Science Publishers Ltd., (Great Britain 1987), no month.

St. Louis, R. M. et al., "Recovery Enhancement in the Mercur Autoclave Circuit", Proceedings of The Gold '90 Symposium, Salt Lake City, Utah, Feb. 26 to Mar. 1, 1990, pp. 443–450, Society for Mining Metallurgy and Exploration, Inc. (Littleton, Colorado 1990), Mar.

Fridman, I. D. et al., "Treating Carbon Containing Ag–Au–As Concentrates," World Mining, vol. 36, pp. 45–47 (Jul., 1983).

Shoemaker, R. S. et al., "Refractory Gold Ore Processing," Advances in Gold and Silver Processing, Proceedings of The Symposium at GoldTech 4, Reno, Nevada, Sep. 10–12, 1990, pp. 113–118, Society for Mining Metallurgy and Exploration, Inc. (Littleton, Colorado 1990), Sep.

*Primary Examiner*—Steven Bos
*Attorney, Agent, or Firm*—Sheridan Ross & McIntosh

[57] ABSTRACT

Provided is a process for treating refractory precious metal-containing ores, particularly gold-bearing ores, which are refractory due to the presence of organic carbon, to reduce the ability of organic carbon to interfere with recovery of the precious metal. The ore may also contain sulfide materials with which the gold is associated and from which the gold is difficult to separate. The ore is comminuted to a size at which at least about 80 weight percent of the ore is smaller than about 40 microns in size. The comminuted ore is then slurried and subjected to pressure oxidation at severe operating conditions. The treating temperature is greater than about 190° C. When sulfide minerals are present, substantially all of the sulfide sulfur must first be oxidized prior to obtaining significant benefit from the treatment of the organic carbon. Greater than about 96% of the sulfide sulfur must be oxidized.

44 Claims, 7 Drawing Sheets

METHOD FOR TREATING MINERAL MATERIAL HAVING ORGANIC CARBON TO FACILITATE RECOVERY OF GOLD AND SILVER

FIELD OF THE INVENTION

The present invention involves pressure oxidation of precious metal-containing mineral material, such as gold-bearing ores, which are refractory to standard gold recovery operations due to the presence of organic carbon, and also, possibly, sulfide minerals.

BACKGROUND OF THE INVENTION

Several precious metal-bearing ores, such as many gold and silver-bearing ores, are known to be refractory to standard recovery techniques such as cyanidation. An ore can be refractory due to the presence of sulfide minerals with which the precious metal is associated and from which the precious metal is difficult to separate. Typically, refractory sulfide ores are treated by decomposing the sulfide minerals in order to release the precious metal for subsequent recovery. One process for treating refractory sulfide ores is to pressure oxidize the ore at elevated temperature and pressure under acidic conditions to oxidize sulfide sulfur in the sulfide minerals.

Another reason that an ore might be refractory is that the ore contains significant amounts of organic carbon that can adsorb the precious metal in competition with a recovery operation. For example, during cyanidation recovery, an ore is leached with a cyanide to form a cyanide complex with the precious metal in the ore. The precious metal-cyanide complex can be adsorbed onto activated carbon granules and the precious metal recovered from the activated carbon granules. When organic carbon is present in the ore, however, the organic carbon can compete with the activated carbon for adsorbing the precious metal-cyanide complex, thereby significantly reducing the amount of precious metal that is recovered. The adsorption of the precious metal by the organic carbon is often referred to as preg-robbing, because the organic carbon is robbing the precious metal from a precious metal pregnant solution.

The acidic pressure oxidation process that has been used for sulfide refractory ores has not been found to be satisfactory for sufficiently reducing the preg-robbing problem when organic carbon is present. One process that has been used to treat refractory organic carbon ores is to subject the ore to a chlorination treatment prior to gold recovery using a chlorine-containing material. Chlorination, however, can be very expensive and is not satisfactory when the ore is also refractory due to the presence of sulfide minerals that are associated with the gold.

One process that has been used to treat ores that are refractory due to the presence of both sulfide minerals and organic carbon is to oxidatively roast the ore to oxidize substantially all of both the organic carbon and the sulfide minerals. Roasting is expensive, however, because the ore must be dry ground. Also, when the ore contains arsenic, a significant amount of arsenic is volatilized during roasting and poses a significant environmental problem. A similar problem also occurs for mercury when mercury is present in the ore. Also, solid residues, or calcines, of the roasting process often contain significant amounts of toxic substances, such as arsenic, in a soluble form, which require substantial additional treatment for safe disposal.

A need exists for a relatively simple and inexpensive processes for treating gold-bearing ores that are refractory due to the presence of organic carbon, and especially for those ores that are also refractory due to the presence sulfide minerals associated with the gold.

SUMMARY OF THE INVENTION

The present invention provides a process for treating precious metal-containing ores and other mineral materials that are refractory due to the presence of organic carbon to reduce the preg-robbing ability of organic carbon and, thereby, to permit high recoveries of the precious metal to be achieved. The process is particularly useful for treating gold-bearing whole ores to permit subsequent recovery of the gold.

With the process of the present invention, it has been surprisingly found that pressure oxidation can be used to effectively treat organic carbon refractory mineral materials when the mineral material is ground to a very fine size and is subjected to severe pressure oxidation conditions. At least about 80 weight percent of mineral material particles in a feed slurry are smaller than about 40 microns in size, which facilitates pressure oxidation to reduce the ability of organic carbon to interfere with possible recovery of precious metal from the ore. In addition to the very fine particle size of the mineral material, pressure oxidation is conducted at a high temperature, greater than about 190° C. In one preferred embodiment, the mineral material is ground to a size where at least about 80 weight percent of particles of the mineral material are smaller than about 30 microns, and more preferably smaller than about 20 microns. A preferred pressure oxidation treating temperature is greater than about 200° C. Particularly good results are achieved at treating temperatures of greater than about 210° C., and especially when the treating temperature is greater than about 220° C.

A particularly surprising benefit when using the process of the present invention is that high precious metal recoveries can be achieved for mineral materials containing significant organic carbon using a pressure oxidation treatment prior to precious metal recovery, without oxidizing substantially all of the organic carbon. Therefore, it is believed that the organic carbon that remains unoxidized following pressure oxidation has been passivated during the pressure oxidation to reduce the activity of that organic carbon as an adsorbent for the precious metal.

In addition to the organic carbon, the mineral material may also be refractory due to the presence of sulfide minerals with which the precious metal is associated and from which the precious metal is difficult to separate. During pressure oxidation, substantially all sulfide sulfur is oxidized, thereby releasing the precious metal from the sulfide minerals and allowing the precious metal to be recovered, such as by cyanidation. It has been found, however, that at least about 96% of the sulfide sulfur must be oxidized in order to effectively treat the organic carbon to significantly reduce the ability of the organic carbon to preg-rob the precious metal during subsequent precious metal recovery operations. Therefore, enhanced precious metal recoveries which may be achieved according to the process of the present invention are due to the treatment of organic carbon over and above that treating which is necessary to release substantially all of the precious metal from the sulfide minerals.

Following pressure oxidation the oxidized slurry should have a very low pH, preferably below pH 1.5, to assure satisfactory treatment of the organic carbon. When the mineral material has sufficient sulfide sulfur to produce a desired level of acid for the pressure oxidation, then pretreatment with sulfuric acid prior to pressure oxidation is not necessary. If a mineral material, such as a carbonate-containing ore, is treated which does not contain enough sulfide sulfur to produce the required acid, then the mineral material may be blended with another mineral material which has sufficient sulfide sulfur to generate the desired acid, including compensation for acid that may be consumed by carbonate materials.

DETAILED DESCRIPTION

Figure 1:
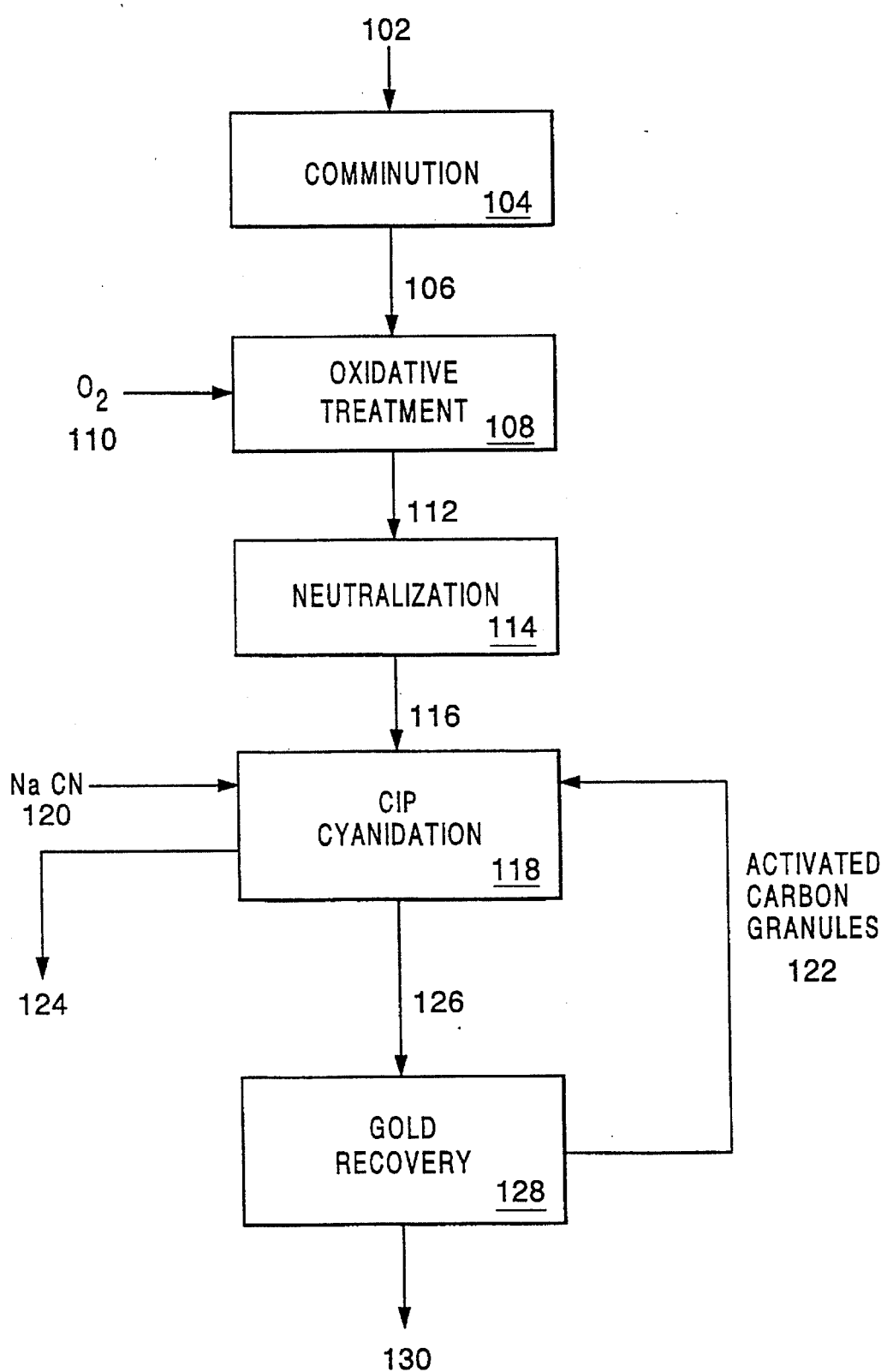
FIG. 1 is a process flow diagram for one embodiment of the present invention.

The present invention provides a method for processing a precious metal-containing mineral material which is refractory due to the presence of organic carbon, which can compete for absorption of the precious metal and can, thereby, reduce recovery of the precious metal during precious metal recovery operations. Very fine particles of the precious-metal containing mineral material are pressure oxidized under severe pressure oxidation conditions. It has been found that both a very fine particle size and a very high pressure oxidation temperature are needed to satisfactorily treat the mineral material to facilitate a high recovery of the precious metal.

As used herein, precious metal refers to gold and/or silver. The process of the present invention is especially preferred for use with gold-bearing mineral materials.

As used herein, mineral material includes whole ores, ore concentrates, tailings, and residue from previous mining or milling operations. The present invention is particularly useful for treating whole ores because the preg-robbing capability of whole ores can be satisfactorily reduced without the expense of preparing an ore concentrate. Furthermore, it has been found that in preparing an ore concentrate by flotation from a whole ore having significant organic carbon, it is very difficult to prevent the organic carbon from concentrating in the ore concentrate. Moreover, when an ore concentrate is prepared there is at least some loss of precious metal to the reject in preparing the ore concentrate. The problems associated with ore concentrates, however, can be avoided by treating a whole ore according to the process of the present invention.

Organic carbon which can be treated according to the present invention includes any carbonaceous organic material which has an affinity for the precious metal, a salt of the precious metal, and/or a complex of the precious metal with a ligand, such that the organic carbon is active as an adsorbent that can preg-rob precious metal during precious metal recovery operations. For example, during precious metal recovery by cyanidation the organic carbon could act as an adsorbent for a gold-cyanide complex and could, therefore, compete for the gold with the recovery process, thereby reducing gold recovery.

Mineral materials that may be treated with the present invention may comprise, in addition to organic carbon, sulfide minerals with which the precious metal may be closely associated and from which the precious metal may be difficult to separate. It has been found with the process of the present invention that pressure oxidation can be successfully used to release, or liberate, the precious metal from the sulfide minerals and also to oxidize and/or passivate organic carbon so that the activity of organic carbon as an adsorbent is reduced to a level to permit high precious metal recoveries. It has been found, however, that substantially all of the sulfide sulfur present in the mineral material must be oxidized before a significant benefit is achieved from treating the organic carbon. Surprisingly, at least about 96% of the sulfide sulfur must be oxidized before significant benefit from the treatment of organic carbon is realized. Severe pressure oxidation treating conditions are, therefore, required according to present invention.

The surprising discoveries leading to the process of the present invention were made during research relating to possible processes for treating gold-bearing refractory ores from the Twin Creeks Mine in Nevada, which is owned by Santa Fe Pacific Gold Corporation. The Twin Creeks Mine contains several different ore types with varying mineralogies. Some of the ore types comprise very high organic carbon levels, sometimes in excess of 1 weight percent, which will preg-rob essentially all available gold during standard cyanidation recovery procedures. All of the high organic carbon ore types are also refractory due to the presence of sulfide minerals with which the gold is associated.

Tests were performed on refractory ores from the Twin Creeks Mine to identify possible treatments that might permit satisfactory gold recovery. The refractory ores contain significant amounts of both organic carbon and sulfide minerals. Initial treating attempts included pressure oxidation of a whole ore under unusually severe operating conditions. The ore was ground to a size where 80% of the particles are 74 microns or smaller in size (P80=74 microns). The ore was then pressure oxidized under highly acidic conditions at a temperature of 225° C. and a pressure of 460 psia (3172 kPa) with an oxygen gas overpressure of 100 psig (690 kPa) for a period of two hours in a batch stirred autoclave. Essentially all of the sulfide sulfur was oxidized (97%+), thereby assuring that essentially all of the gold had been released from the sulfide minerals. Gold recoveries using a cyanidation treatment following pressure oxidation were still very low, however, indicating that the pressure oxidation treatment had not satisfactorily reduced the preg-robbing ability of the organic carbon.

Following the initial failure with pressure oxidation, a variety of other processes were tried. Chlorination was tried, but proved to be ineffective at oxidizing the sulfide sulfur. Significant improvements in gold recoveries were experienced using an oxidative roasting technique which proved effective at oxidizing substantially all of the sulfide sulfur and the organic carbon. Gold recoveries by cyanidation following oxidative roasting were between about 80% and 90%. Although providing significant improvements in gold recoveries, however, roasting had several problems. First, arsenic and mercury in the ore volatilized during ore drying and grinding. Also, residues from the roasting contained significant amounts of soluble arsenic which is unsuitable for tailings disposal without significant additional treatment. In addition to these significant environmental problems, the moisture content of the ore was too high for low cost ore drying and grinding. Furthermore, fine dry grinding (P80= 74) was required to achieve acceptable gold recoveries. Moreover, the dry ground ores proved to be very difficult to feed on a continuous basis. Also, it was determined that roasting would have to be conducted at low temperatures which would present significant engineering, design and safety problems.

Because of the problems associated with oxidative roasting, additional research was performed on pressure oxidation treatment, primarily because of its ability to produce stable arsenic residues.

Even though the previous grind at P80=74 microns had resulted in substantially complete sulfide sulfur oxidation and liberation of the gold, gold recoveries were, nevertheless, very low. Surprisingly, however, it was found that a combination of very fine grinding and severe pressure oxidation conditions results in significantly increased gold recoveries. The result is particularly surprising because the high gold recoveries are achievable without oxidizing substantially all of the organic carbon in the treated ores. Therefore, not to be bound by theory but to assist in the understanding of the present invention, it is believed that the process of the present invention results in significant passivation of organic carbon that remains unoxidized during the oxidative treating. This result is particularly important because all of the tests indicate that, even following the most severe pressure oxidation treating conditions, a substantial amount of organic carbon remains unoxidized. Therefore, unlike oxidative roasting, the present invention does not require complete oxidation of organic carbon. As used herein, oxidation of organic carbon refers to chemically combining carbon with oxygen. Much of the oxidized organic carbon may be in the form of carbon dioxide.

According to the process of the present invention, the mineral material is comminuted to a size of P80=40 microns or smaller, and preferably to a size of P80=30 microns or smaller. Although adding to the cost due to additional grinding, it has been found that especially high gold recoveries are achievable with a mineral material particle size of P80=20 microns or smaller. Particularly preferred for practical application is a particle size of from about P80 =15 microns to about P80=25 microns.

Particulate mineral material of the proper size is slurried in an aqueous liquid and is then subjected to oxidative treatment in an autoclave to pressure leach the mineral material. As noted previously, in addition to the extremely fine particle size of the mineral material, the operating conditions of the oxidative treatment are severe. The treating temperature should be greater than about 190° C., preferably greater than about 200° C. and more preferably greater than about 210° C. Particularly good results are achieved with a treating temperature of greater than about 220° C. Depending upon the particular ore, an especially preferred range of treating temperatures is from about 205° C. to about 260° C.

The oxidative treatment is performed in the presence of an oxygen-containing material, which typically will be oxygen gas. The use of a purified oxygen gas is preferred to air. Typically, an oxygen gas overpressure of greater than about 25 psig (172 Kpa) is sufficient, although an oxygen gas overpressure of greater than about 50 psig (345 kPa) is preferred.

The total treating pressure will generally be equal to the pressure exerted by the aqueous liquid at the treating pressure plus the oxygen gas overpressure. Oxidative treating generally should be conducted with a retention time of from about 20 minutes to about 120 minutes, with times between about 30 minutes and about 90 minutes being preferred.

As mentioned previously, one particularly surprising result of using the process of the present invention is that high precious metal recoveries can be attained without oxidizing all, or even substantially all, of the organic carbon in the mineral material being treated. Typically, satisfactory gold recoveries can be achieved with oxidation of less than about 60 weight percent of the organic carbon, and preferably it is necessary to oxidize only from about 10 weight percent to about 40 weight percent of the organic carbon. In many instances, it may be possible to obtain high gold recoveries with only 20 weight percent organic carbon oxidation, or less. As noted, the organic carbon remaining unoxidized is believed to be passivated in that its activity as an adsorbent that could preg-rob precious metal during precious metal recovery operations is significantly reduced.

Although the present invention can be used for ore concentrates and other mineral materials, as noted previously, the present invention is particularly useful for treating whole ores. Problems associated with treating ore concentrates are thereby avoided. The present invention is useful for any ores containing organic carbon, but is particularly useful for those comprising greater than about 0.3 weight percent organic carbon, preferably greater than about 0.4 weight percent organic carbon, and more preferably greater than about 0.6 weight percent organic carbon.

The oxidative treatment should be performed at highly acidic conditions. Preferably, the liquid of an oxidized slurry produced during pressure oxidation should have a pH of less than about pH 1.5. For ores which contain a significant amount of sulfide sulfur, sufficient sulfuric acid may be produced during the oxidative treating step to provide the desired low pH. Otherwise, it may be necessary to add sulfuric acid to the feed slurry prior to the oxidative treatment.

When the mineral material comprises sulfide minerals in addition to organic carbon, it has been found, surprisingly, that it is necessary to oxidize substantially all of the sulfide sulfur before a significant benefit is obtained from the treatment of the organic carbon. It has been found that at least about 96% of the sulfide sulfur should be oxidized to permit sufficient oxidation and/or passivation of the organic carbon. This is because the adsorbent activity of the organic carbon does not appear to be sufficiently reduced until after substantially all of the sulfide sulfur has been oxidized. The present invention can be used with any mineral material containing both sulfide sulfur and organic carbon. The mineral material may comprise greater than about 2 weight percent or even greater than about 4 weight percent sulfide sulfur. Thus, the process of the present invention is particularly useful for sulfide refractory whole ores which also contain significant organic carbon.

As mentioned previously, when sufficient sulfide sulfur is present to produce a desired level of sulfuric acid, it is not necessary to pretreat the feed slurry with sulfuric acid prior to the oxidative treatment. Preferably, liquid in the oxidized slurry following the oxidative treatment will contain greater than about 10 grams per liter of free acid. More preferably, the free acid will be greater than about 15 grams per liter. When the free acid in the oxidized slurry is too low, it has been found that the precious metal recovery can be significantly reduced.

When there is insufficient sulfide sulfur in the mineral material to generate sufficient sulfuric acid, then it may be necessary to pretreat the feed slurry with sulfuric acid prior to oxidative treatment. One mineral material having a substantial amount of sulfide sulfur can be blended with another mineral material which is deficient in sulfide sulfur, so that the blend will have a sufficient sulfide sulfur to produce the required free acid. Therefore, an ore having a high sulfide sulfur content could be blended with another ore having a high carbonate content, which consumes acid, to provide a blend with sufficiently high sulfide sulfur to balance out the acid that may be consumed by the carbonate material and to provide the desired free acid in the oxidized slurry. In one embodiment, it may be desirable to provide the sulfide sulfur in the form of an ore concentrate from which carbonate materials have been substantially removed for blending purposes.

In one preferred embodiment, when both sulfide sulfur and organic carbon are present in the mineral material, the treating temperature is greater than about 190° C., the total pretreating pressure is greater than about 190 psia (1309 kPa), the oxygen gas overpressure is maintained at greater than about 25 psig (172 kPa), and liquid in the oxidized slurry is greater than about 10 grams per liter of sulfuric acid. More preferably, the treating temperature is greater than about 200° C., the total treating pressure is greater than about 250 psia and the oxygen gas overpressure is maintained at about 25 psig (172 kPa). Most preferably, the treating temperature is greater than about 220° C., the total pressure is greater than about 380 psia (2620 kPa) and the oxygen gas overpressure is maintained at greater than about 50 psig (345 kPa).

Following pressure oxidation, the precious metal in the oxidated slurry may be recovered by any suitable recovery technique. One recovery technique is to neutralize the oxidized slurry and then to contact the oxidized slurry with a cyanide, such as sodium cyanide, at a pH of greater than about pH 10 so that precious metal in the oxidized slurry can form a cyanide complex. The precious metal-cyanide complex can then be separated from the oxidized slurry by adsorbing the complex on granules of activated carbon. The precious metal can then be recovered from the activated carbon and a purified metal product comprising the precious metal can be produced.

One embodiment of the present invention will now be described with reference to FIG. 1. A refractory whole ore 102 feed is provided having approximately 0.2 ounces per ton of gold, which is associated predominantly with sulfide minerals. The ore 102 comprises between about 2% and 3% sulfide sulfur and from about 0.6 to about 1 weight percent organic carbon. The ore 102 is subjected to comminution 104, such as grinding, to produce particles of ore at a size of P80 =20–22 microns.

A feed slurry 106 having comminuted ore particles slurried in an aqueous liquid is then subjected to oxidative treatment 108 in the presence of oxygen gas 110. Oxidative treatment is performed in an autoclave at a temperature of about 225° C. and at a total pressure of about 460 psia (3172 kPa) with an oxygen gas overpressure of 100 psig (690 kPa), for a retention time of about 60 minutes. During the oxidative treatment 108, greater than about 96% of the sulfide sulfur in the feed slurry 106 is oxidized. Also, a portion, but less than all, of the organic carbon is oxidized and the preg-robbing ability of organic carbon remaining unoxidized is significantly reduced relative to the ore in the feed slurry 106. An oxidized slurry 112 contains solid residue of the ore 102 following oxidative treatment and the liquid of the oxidized slurry has a pH of less than about 1.5.

The oxidized slurry 112 is subjected to neutralization 114 where the pH of the oxidized slurry 112 is increased to greater than about pH 10. A neutralized slurry 116 is then subjected to carbon-in-pulp cyanidation 118 by treatment of the neutralized slurry 116 with sodium cyanide 120 to form a gold-cyanide complex which can be adsorbed onto activated carbon granules 122. Tailings 124 from the carbon-in-pulp cyanidation 118 are disposed of by appropriate means and activated carbon granules loaded with gold 126 are separated and sent to gold recovery 128 where the gold-cyanide complex is stripped from the loaded activated carbon granules and a purified gold product 130 is produced, such as by electrowinning and refining. The activated carbon granules 122, which are now barren of the gold-cyanide complex, are recycled to the carbon-in-pulp cyanidation 118.

The process of the present invention is further described in the following Examples, all of which are non-limiting with respect to the scope of the process of the present invention.

EXAMPLE 1

This example shows the effect on gold recovery of grind size for several ore types from the Twin Creeks Mine.

Compositional attributes of five individual ore types (MC, SWS, US, HGO and DZ ores) and of one ore composite (RC#1) are shown in Table 1. Sulfide sulfur in the individual ores ranges from a low of 1.12 weight percent for the DZ ore to 8.34 weight percent for the SWS ore. Organic carbon in the individual ores ranges from a low of 0.36 weight percent in the DZ ore to a high of 1.36 weight percent in the MC ore. The RC#1 composite comprises about 2.6 weight percent sulfide sulfur and about 1.0 weight percent organic carbon.

A series of samples having different grind sizes are prepared for each ore type and for the ore composite. Each sample is slurried with water and placed in a stirred tank batch autoclave. In the open autoclave, the slurried sample is treated with sulfuric acid to maintain a pH of 2. The autoclave is closed and the slurry is mixed and heated to the desired temperature for pressure oxidation. Oxygen gas is introduced into the autoclave and pressure oxidation is conducted for a time of 90–120 minutes. The autoclave is then cooled rapidly with a water spray and the oxidized slurry is neutralized in two stages to pH 10.15 using lime. The slurry is then subjected to carbon-in-leach cyanidation by placing the remaining solids in a jar containing 15–20 grams per liter of activated charcoal and adding 1 gram of sodium cyanide per liter of slurry at a slurry density of 30% solids and a pH of pH 10.5. The slurry is agitated for 24 hours and then the solids and activated charcoal are analyzed separately to determine the level of gold extraction.

Figure 2:
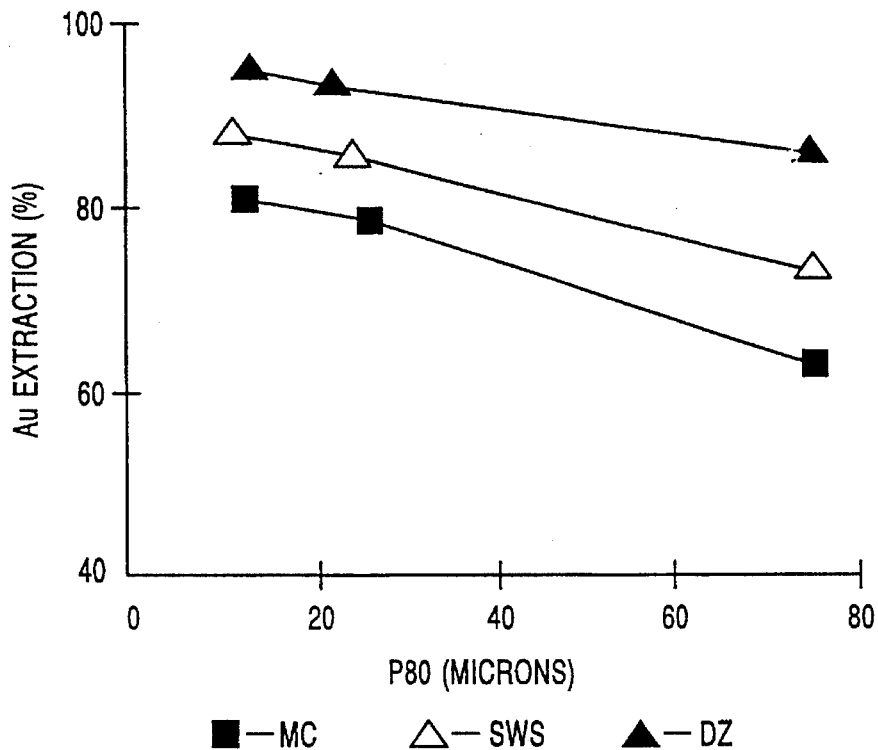
FIG. 2 is a graphical plot of percent gold extraction versus grind size for some ore types from the Twin Creeks Mine.
Figure 3:
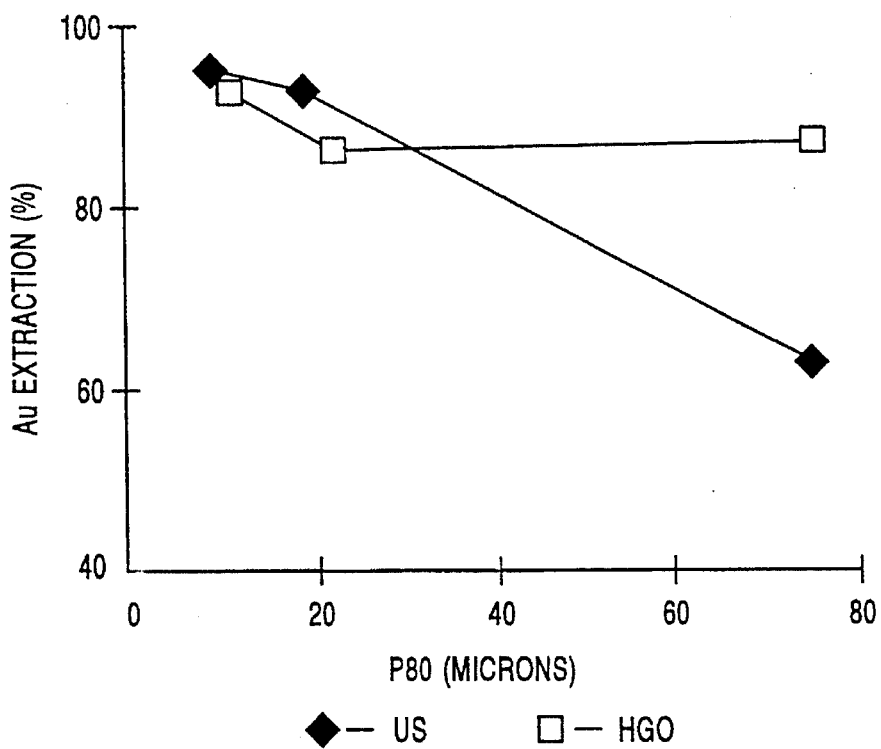
FIG. 3 is a graphical plot of gold extraction versus grind size for other ore types from the Twin Creeks Mine.

Test results for individual ores are tabulated in Table 2 and shown graphically in FIGS. 2 and 3. As seen in Table 2 and FIGS. 2 and 3, gold recovery significantly increases as the grind size is reduced for the individual ores.

Figure 4:
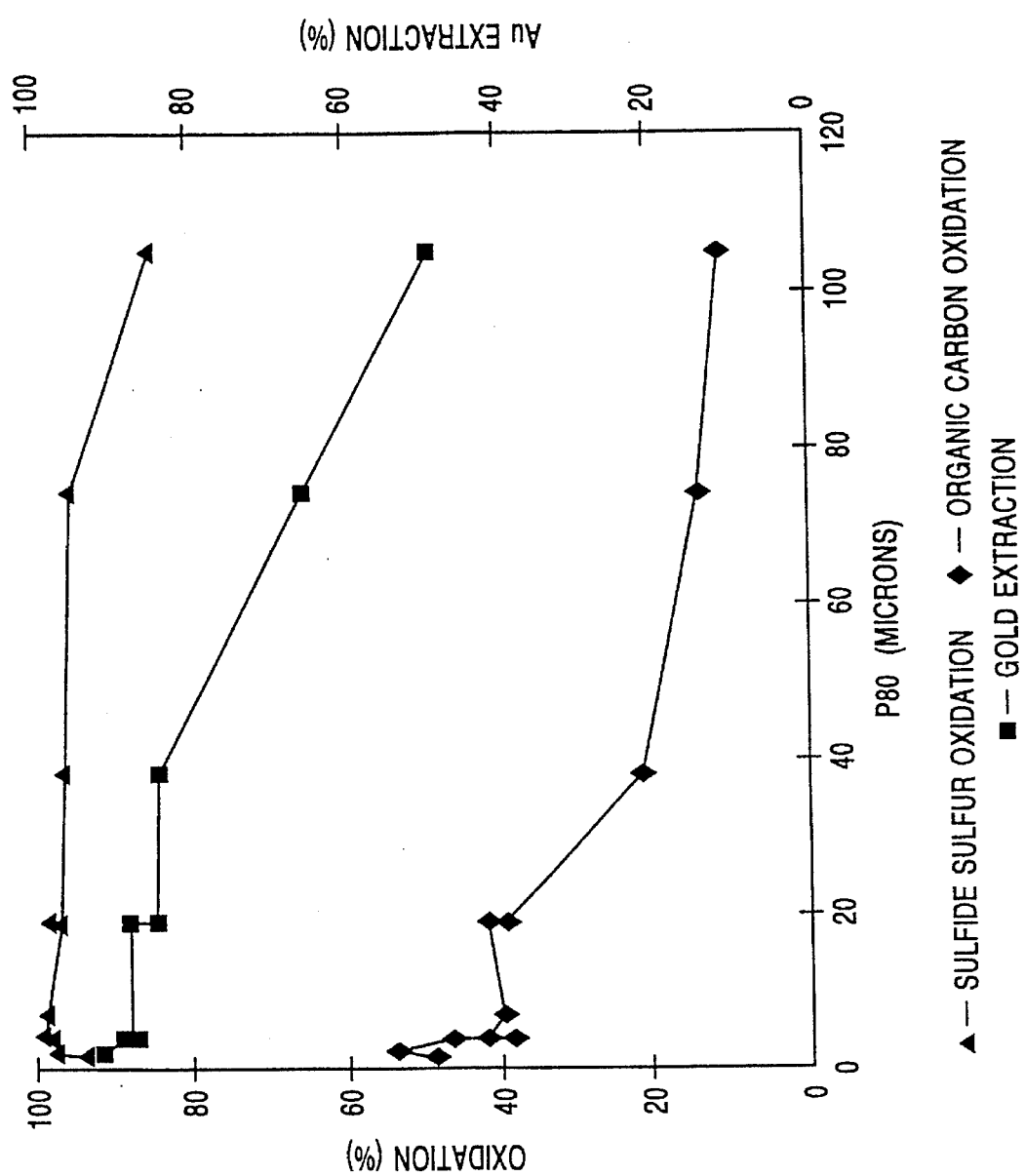
FIG. 4 is a graphical plot of sulfide sulfur oxidation, organic carbon oxidation and gold extraction versus grind size for an ore composite sample from the Twin Creeks Mine.

Test results for the RC#1 ore composite are tabulated in Table 3 and shown graphically in FIG. 4. Again, gold extraction generally increases with decreasing grind size. Additionally, however, the RC#1 ore composite results show that the increased gold extraction with finer grinds cannot be explained simply by the liberation of additional gold, because gold extractions continue to increase significantly even after sulfide sulfur oxidation reaches 95 weight percent. Gold extractions of higher than about 80% are not achieved until sulfide sulfur oxidation is greater than about 96%. Also, the high gold extractions achieved above about 96% sulfide sulfur oxidation do not appear to be due solely to increased oxidation of organic carbon. Rather, it appears that organic carbon remaining unoxidized is somehow passivated to reduce the activity of the organic carbon as an adsorbent for gold, thereby reducing the preg-robbing ability of that organic carbon.

TABLE 1

Individual Ore and Ore Composite Attributes

|  | MC | SWS | US | HGO | DZ | RC#1[2] |
|---|---|---|---|---|---|---|
| Au (oz/st)[1] | 0.159 | 0.212 | 0.421 | 0.186 | 0.169 | 0.212 |
| Ag (oz/st)[1] | 0.07 | 0.06 | 0.06 | 0.06 | 0.01 | 0.06 |
| As (wt. %) | 0.718 | 0.631 | 0.671 | 0.256 | 0.248 | 0.648 |
| Sulfide Sulfur (wt. %) | 2.96 | 8.34 | 4.28 | 2.33 | 1.12 | 2.6 |
| Fe (wt. %) | 2.37 | 2.86 | 4.6 | 2.83 | 3.14 | 2.79 |
| Sb (wt. %) | 0.065 | 0.264 | 0.014 | 0.2 | 0.035 | 0.06 |
| Hg (ppm by weight) | 60.6 | 91.1 | 26.7 | 46.6 | 87.0 | 54.7 |
| $SiO_2$ (wt. %) | 71.4 | 52.3 | 67.0 | 64.8 | 80.5 | 72.3 |
| $CO_3$ (wt. %) | 5.42 | 10.8 | 4.2 | 9.05 | 0.5 | 5.48 |
| Organic Carbon (wt. %) | 1.36 | 0.54 | 0.87 | 0.74 | 0.36 | 1.0 |

[1] Ounces per standard ton
[2] Ore composite made from 65.0 wt. % MC, 19.6% US, 12.5 wt. % HGO, and 2.9 wt. % DZ

TABLE 2

Different Grinds for Individual Ores[1]

| Ore Sample | Grind (P80, μ)[2] | Au Extraction (%) | NaCN Consumption (lb/st)[3] |
|---|---|---|---|
| MC | 75 | 63.2 | 13.6 |
| MC | 26 | 79.1 | 1.9 |
| MC | 12.5 | 81.3 | 3.1 |
| SWS | 75 | 73.1 | 9.2 |
| SWS | 24 | 85.7 | 2.1 |
| SWS | 11 | 88.1 | 2.8 |
| US | 75 | 62.9 | 3.4 |
| US | 19 | 93.2 | 1.9 |
| US | 9 | 95.3 | 2.5 |
| HGO | 75 | 87.0 | 1.3 |
| HGO | 22 | 86.3 | 2.6 |
| HGO | 11 | 93.2 | 1.1 |
| DZ | 75 | 86.0 | 1.4 |
| DZ | 22 | 93.4 | 2.5 |
| DZ | 13 | 94.6 | 2.7 |

[1] Autoclave conditions: 200–225° C., 50–100 psig (345–690 kPa) oxygen overpressure, 90–120 minutes retention, 30–40% solids in slurry
[2] 80 wt. % of sample smaller than the size in microns shown
[3] Pounds per standard ton of ore

TABLE 3

Different Grinds of RC#1 Composite[1]

| Grind (P80, μ)[2] | Sulfide Sulfur Oxidation (%) | Organic Carbon Oxidation (%) | Au Extraction (%) |
|---|---|---|---|
| 105 | 84.5 | 11.1 | 48.9 |
| 74 | 95.3 | 13.9 | 65.5 |
| 38 | 96.0 | 21.2 | 83.8 |
| 19 | 96.7 | 39.4 | 84.3 |
| 19 | 97.7 | 41.4 | 87.6 |
| 7 | 98.4 | 39.4 | 90.7 |
| 4 | 97.7 | 42.4 | 86.6 |
| 4 | 98.9 | 46.5 | 88.5 |
| 4 | 97.9 | 38.4 | 86.8 |
| 2.5 | 97.6 | 53.5 | 91.5 |
| 1.5 | 93.5 | 48.5 | 91.8 |

[1] Autoclave conditions: 225° C., 50–100 (345–690 kPa) psig oxygen overpressure, 120 minutes retention, 30% solids in slurry
[2] 80 wt. % of sample smaller than the size in microns shown

EXAMPLE 2

This example shows the effect of pressure oxidation temperature on gold recovery.

Figure 5:
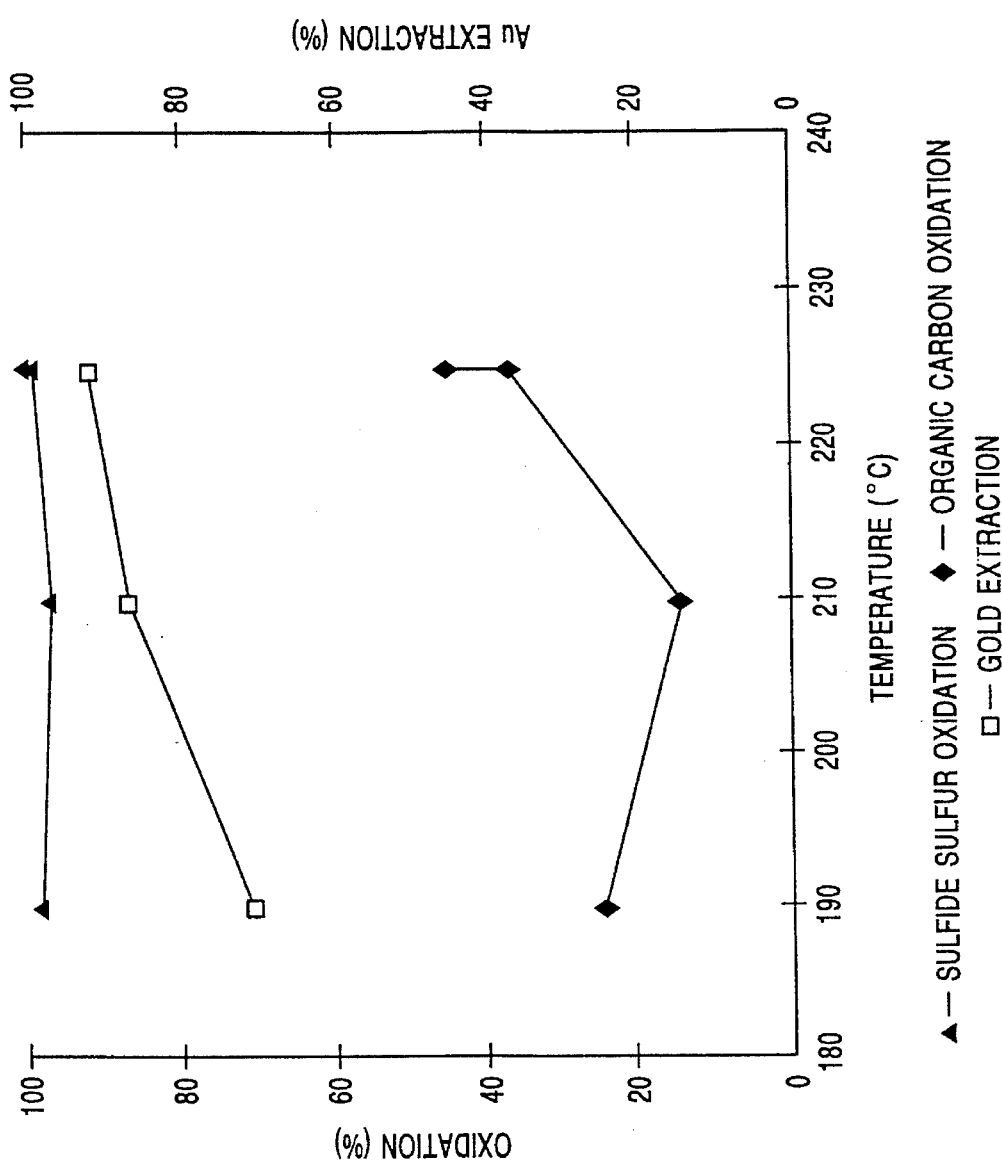
FIG. 5 is a graphical plot of sulfide sulfur oxidation, organic carbon oxidation and gold extraction versus temperature for an ore composite sample from the Twin Creeks Mine.

Tests are run on samples of the RC#1 ore composite at different temperatures for a grind size of about P80=10 microns. The test procedure is the same as that used in Example 1. Table 4 tabulates the results, which are also shown graphically in FIG. 5. The results show that higher temperatures result in generally higher gold recoveries. Again, the increased gold recoveries are not due to the liberation of additional gold by oxidation of additional sulfide sulfur, because sulfide sulfur oxidation is substantially complete in all tests. Rather, the increased gold recovery appears to be due to benefits obtained by treating the organic carbon to oxidize and/or passivate the organic carbon following substantially complete oxidation of the sulfide sulfur.

TABLE 5

| | Free Acid in Autoclave Discharge RC#1 Composite[1] | | | |
|---|---|---|---|---|
| $H_2SO_4$ Added to Feed Slurry (lb/st)[2] | Free $H_2SO_4$ in Autoclave Discharge (g/L)[3] | Sulfide Sulfur Oxidation (%) | Organic Carbon Oxidation (%) | Au Extraction (%) |
| 317 | 33.3 | 99.3 | 64.6 | 90.6 |
| 255 | 29.1 | 98.9 | 50.5 | 89.7 |
| 241 | 34.3 | 98.9 | 50.5 | 89.8 |
| 160 | 27.2 | 97.4 | 28.3 | 87.8 |
| 80 | 12.5 | 97.9 | 26.3 | 79.2 |
| 40 | 6.4 | 88.3 | 32.3 | 69.9 |
| 0 | 0.2 | 84.8 | 39.4 | 72.4 |

[1]Autoclave conditions: particles sized at P80 = 10μ, 225° C., 100 psig (690 kPa) oxygen overpressure, 120 minutes retention
[2]Pounds per standard ton of ore
[3]Grams of free acid per liter of liquid in oxidized slurry discharging from autoclave

TABLE 4

| Temperature in Autoclave RC#1 Composite[1] | | | |
|---|---|---|---|
| Temperature (°C.) | Sulfide Sulfur Oxidation (%) | Organic Carbon Oxidation (%) | Au Extraction (%) |
| 190 | 98.1 | 24.0 | 71.1 |
| 210 | 96.1 | 13.5 | 85.8 |
| 225 | 98.4 | 36.5 | 90.7 |
| 225 | 98.8 | 44.8 | 91.6 |

[1]Autoclave conditions: particles sized at P80 = 10μ, 100 psig (690 kPa) oxygen overpressure, 120 minute retention, 40–50% solids in slurry

EXAMPLE 3

This example shows the effect of free acid in the oxidized slurry on gold recovery.

Figure 6:
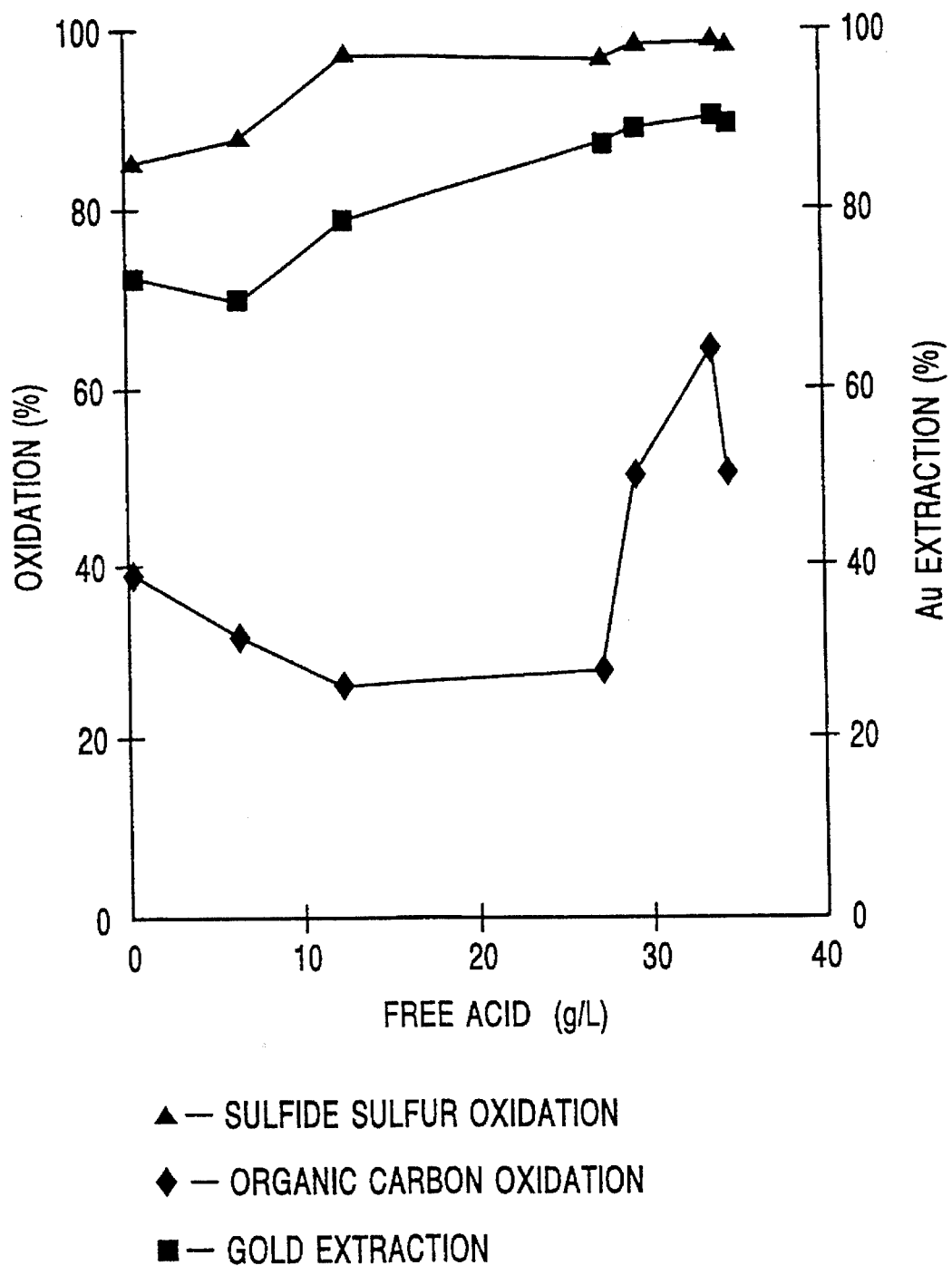
FIG. 6 is a graphical plot of sulfide sulfur oxidation, organic carbon oxidation and gold extraction versus free acid in an oxidized slurry for an ore composite from the Twin Creeks Mine.

Several tests are performed using RC#1 ore composite samples. The tests are performed according to the same procedure as that in Example 1, except different amounts of sulfuric acid are added to the feed slurry in the open autoclave, thereby resulting in different levels of free acid in the autoclave discharge following pressure oxidation. Results of the tests are tabulated in Table 5 and are shown graphically in FIG. 6. Gold recoveries generally increase with increasing free acid in the autoclave discharge. Again, increasing gold recoveries even after substantially complete sulfide sulfur oxidation has been achieved indicate an oxidation/passivation benefit from treating of the organic carbon following substantially complete oxidation of the sulfide sulfur.

EXAMPLE 4

This example shows reduction of the preg-robbing ability of organic carbon.

Two ores are tested an MC ore and a US ore. The ore samples are sized at P80=20 to 22 microns and are subjected to pressure oxidation at 225° C. and 100 psig (690 kPa) oxygen overpressure. Pressure oxidation occurs in a continuous four stage stirred autoclave with solid samples being taken from the autoclave feed, from each of stages 1–4 of the autoclave, and from the autoclave discharge.

A leach solution is prepared using 10 kilograms of deionized water, 10 grams of sodium hydroxide and 2.50 grams of sodium cyanide. A gold standard solution is prepared by mixing 750 milliliters of deionized water with 0.25 grams of sodium hydroxide, 0.25 grams of sodium cyanide and 100 grams of a 1004 ppm by weight gold chloride solution. Deionized water is then added to bring the total gold standard solution volume to 1 liter. To a 10 gram solid sample, 100 grams of leach solution is added and thoroughly mixed on a shaker for 24 hours. Ten milliliters of the solution is then drawn off in a pipette and is analyzed for gold using atomic absorption. Ten milliliters of the gold standard is then added to the slurry to provide a gold spike, the slurry is then agitated on a shaker for 10 minutes. The slurry is then allowed to settle and a 10 milliliter sample of solution is pipetted off and analyzed for gold using atomic adsorption. In this way, the ability of the solid samples to preg-rob gold is determined, and is calculated as ounces of gold that are adsorbed from the gold spike per standard ton of ore.

Figure 7:
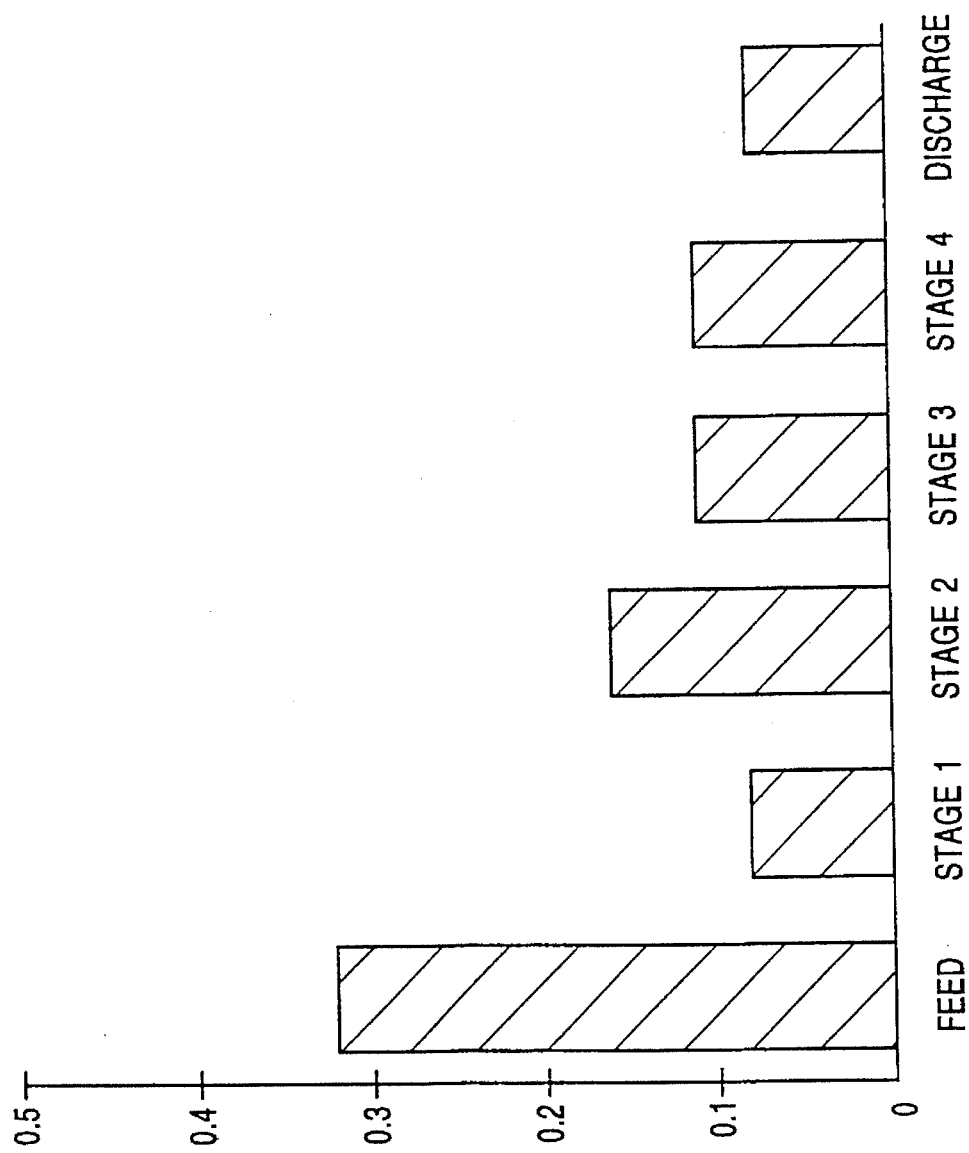
FIG. 7 is a bar graph showing the preg-robbing ability of an ore sample from the Twin Creeks Mine as it progresses through pressure oxidation.
Figure 8:
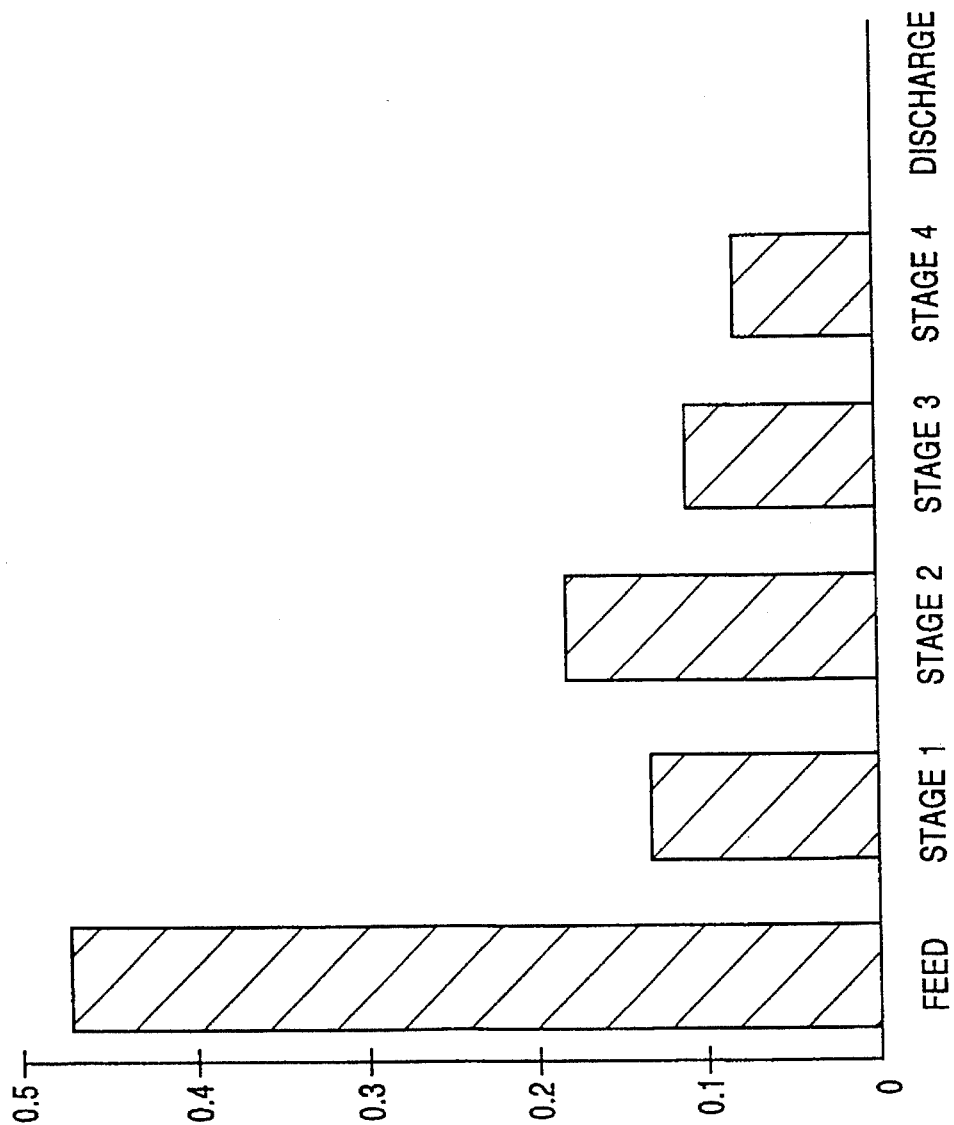
FIG. 8 is a bar graph showing the preg-robbing ability of another ore sample from the Twin Creeks Mine as it progresses through pressure oxidation.

The test results are tabulated in Table 6. Results for the MC ore are shown graphically in FIG. 7 and results for the US ore are shown in FIG. 8. As seen in Table 6 and FIGS. 7 and 8, the preg-robbing ability of the samples for each ore generally decreases as pressure oxidation continues, indicating a significant benefit from oxidation and/or passivation of the organic carbon in the ores.

TABLE 6

Organic Carbon Activity[1]

|  | Particulate Solids Affinity for Au (oz/st)[2] |
|---|---|
| MC Ore | |
| Autoclave Feed | 0.32 |
| Stage 1 | 0.08 |
| Stage 2 | 0.16 |
| Stage 3 | 0.11 |
| Stage 4 | 0.11 |
| Autoclave Discharge | 0.08 |
| US Ore | |
| Autoclave Feed | 0.47 |
| Stage 1 | 0.13 |
| Stage 2 | 0.18 |
| Stage 3 | 0.11 |
| Stage 4 | 0.08 |
| Autoclave Discharge | 0.00 |

[1]Autoclave conditions: sized at P80 = 20 to 22μ, 225° C., 100 psig (690 kPa) oxygen overpressure, retention time 103 minutes for MC and 70 minutes for US, 40% solids in slurry
[2]Ounces of Au per standard ton of ore Various embodiments of the present invention have been described in detail. It should be recognized that any of the elements of any of these described embodiments can be combined in any combination with elements of any other embodiment. Furthermore, modification and adaptations of the disclosed embodiments will be apparent to those skilled in the art. It is to be expressly understood that such modifications and adaptations are within the scope of the present invention as set forth in the following claims.

What is claimed is:

1. A method for processing a mineral material which has a precious metal to reduce the potential for problems with recovery of the precious metal when organic carbon is present, the method comprising the steps of:
    (a) providing a feed slurry having particulate mineral material slurried with aqueous liquid, wherein
        (i) said mineral material comprises a precious metal selected from the group consisting of gold, silver and combinations thereof, and organic carbon which has an ability to interfere with recovery of said precious metal, said mineral material also comprising sulfide sulfur in association with said precious metal and from which said precious metal is difficult to separate, and
        (ii) at least 80 weight percent of particles of said mineral material in said feed slurry are smaller than 38 microns in size, which facilitates oxidative treating of said mineral material to reduce the ability of said organic carbon to interfere with recovery of said precious metal; and
    (b) oxidative treating of said mineral material in said feed slurry comprising subjecting said feed slurry to an oxidizing environment at a temperature of greater than about 190° C. to produce an oxidized slurry, wherein the ability of said organic carbon to interfere with recovery of said precious metal from said oxidized slurry is reduced;
    wherein, during said oxidative treating of said feed slurry, at least 96 percent of sulfide sulfur in said feed slurry is oxidized, thereby permitting substantial passivation of said organic carbon to reduce the ability of said organic carbon to interfere with recovery of said precious metal.

2. The method of claim 1 for processing a mineral material, wherein:
    said organic carbon has an affinity as an adsorbent of at least one of said precious metal, a salt of said precious metal, and a complex of said precious metal with a ligand, which affinity is capable of interfering with recovery of said precious metal; and
    during said subjecting, said affinity of said organic carbon is reduced.

3. The method of claim 2 for processing a mineral material, wherein:
    during said oxidative treating, less than about 60 weight percent of said organic carbon is oxidized and organic carbon that is not oxidized is passivated as an adsorbent to reduce the ability of said organic carbon to interfere with recovery of said precious metal.

4. The method of claim 1 for processing a mineral material, wherein:
    said mineral material comprises greater than about 0.3 weight percent of organic carbon.

5. The method of claim 1 for processing a mineral material, wherein:
    said mineral material comprises greater than about 0.6 weight percent of organic carbon.

6. The method of claim 1 for processing a mineral material, wherein:
    at least about 80 weight percent of said particles of said mineral material in said feed slurry are smaller than about 30 microns in size.

7. The method of claim 1 for processing a mineral material, wherein:
    at least about 80 weight percent of said particles of said mineral material in said feed slurry are smaller than about 20 microns in size.

8. The method of claim 1 for processing a mineral material, wherein:
    liquid of said oxidized slurry has a pH of less than about pH 1.5.

9. The method of claim 1 for processing a mineral material, wherein:
    said oxidative treating of said mineral material comprises subjecting said feed slurry to an oxidizing environment at a temperature of greater than about 200° C.

10. The method of claim 1 for processing a mineral material, wherein:
    said oxidative treating of said mineral material comprises subjecting said feed slurry to an oxidizing environment at a temperature of greater than about 210° C.

11. The method of claim 1 for processing a mineral material, wherein:
    said oxidative treating of said mineral material comprises subjecting said feed slurry to an oxidizing environment at a temperature of greater than about 220° C.

12. The method of claim 1 for processing a mineral material, wherein:
    said oxidative treating of said mineral material comprises subjecting said feed slurry to an oxidizing environment at a temperature of from about 205° C. to about 260° C.

13. The method of claim 1 for processing a mineral material, wherein:
    said oxidative treating of said mineral material comprises subjecting said feed slurry to oxygen gas at an elevated pressure.

14. The method of claim 1 for processing a mineral material, wherein:

following said oxidative treating of said mineral material, said precious metal is contacted with a ligand to form a complex of said precious metal with said ligand; and said precious metal is thereafter removed from said complex and a solid metal product is prepared comprising said precious metal.

15. The method of claim 1 for processing a mineral material, wherein:

said providing of said feed slurry comprises comminuting coarse mineral material to produce said particles of said mineral material.

16. The method of claim 1 for processing a mineral material, wherein:

said mineral material comprises a whole ore.

17. The method of claim 1 for processing a mineral material, wherein:

the method is conducted substantially in the absence of an added chlorine-containing material.

18. The method of claim 1 for processing a mineral material, wherein:

said method is substantially in the absence of roasting of said mineral material.

19. The method of claim 1 for processing a mineral material, wherein:

during said oxidative treating, said feed slurry is subjected to said oxidizing environment for a time of from about 20 minutes to about 120 minutes.

20. A method for processing a mineral material having a precious metal to facilitate recovery of the precious metal by reducing the potential for recovery problems when both sulfide material and organic carbon render the mineral material refractory to precious metal recovery, the method comprising the steps of:

(a) providing a feed slurry having particulate mineral material slurried with an aqueous liquid, wherein
  (i) said mineral material comprises a precious metal selected from the group consisting of gold, silver and combinations thereof; sulfide material, having sulfide sulfur, which is associated with said precious metal and from which said precious metal is difficult to separate to permit recovery of said precious metal; and organic carbon, which has an ability to interfere with recovery of said precious metal, and
  (ii) at least 80 weight percent of particles of said mineral material in said feed slurry are smaller than 38 microns in size, which facilitates oxidative treating of said mineral material to reduce the ability of said organic carbon to interfere with recovery of said precious metal; and (b) oxidative treating of said mineral material comprising subjecting said feed slurry to an oxidizing environment to produce an oxidized slurry, wherein during subjecting of said feed slurry to an oxidizing environment, at least 96 percent of said sulfide sulfur in said feed slurry is oxidized such that precious metal is freed from association with said sulfide sulfur and the ability of said organic carbon to interfere with recovery of said precious metal is reduced.

21. The method of claim 20 for processing a mineral material, wherein:

during said oxidative treating of said mineral material, at least a portion of, but less than all of, said organic carbon is oxidized and organic carbon remaining unoxidized is passivated to reduce the ability of said organic carbon remaining unoxidized to interfere with recovery of said precious metal.

22. The method of claims 20 for processing a mineral material, wherein:

during said oxidative treating of said mineral material, less than about 60 weight percent of said organic carbon is oxidized.

23. The method of claim 20 for processing a mineral material, wherein:

during said oxidative treating of said mineral material, from about 10 weight percent to about 40 weight percent of said organic carbon is oxidized.

24. The method of claim 20 for processing a mineral material, wherein:

said mineral material comprises greater than about 2 weight percent sulfide sulfur.

25. The method of claim 20 for processing a mineral material, wherein:

said mineral material comprises greater than about 4 weight percent sulfide sulfur.

26. The method of claim 20 for processing a mineral material, wherein:

said mineral material comprises greater than about 0.4 weight percent organic carbon.

27. The method of claim 20 for processing a mineral material, wherein:

liquid of said oxidized slurry comprises greater than about 10 grams of free acid per liter of said liquid.

28. The method of claim 27 for processing a mineral material, wherein:

said free acid comprises free sulfuric acid.

29. The method of claim 28 for processing a mineral material, wherein:

said mineral material comprises a blend of a first material comprising a carbonate mineral and at least one other material comprising sulfide sulfur, such that said mineral material comprises sufficient sulfide sulfur to permit production of sufficient acid during said pressure oxidation to provide said free acid in said oxidized slurry.

30. The method of claim 20 for processing a mineral material, wherein:

liquid of said oxidized slurry comprises greater than about 15 grams of free acid per liter of said liquid.

31. The method of claim 20 for processing a mineral material, wherein:

at least about 80 weight percent of said particles of said mineral material in said feed slurry are smaller than about 30 microns in size.

32. The method of claim 20 for processing a mineral material, wherein:

at least about 80 weight percent of said particles of said mineral material in said feed slurry are smaller than about 20 microns in size.

33. The method of claim 20 for processing a mineral material, wherein:

said oxidative treating of said feed slurry comprises subjecting said feed slurry to an oxidizing environment at a temperature of greater than about 190° C.

34. The method of claim 20 for processing a mineral material, wherein:

said oxidative treating of said feed slurry comprises subjecting said feed slurry to an oxidizing environment at a temperature of greater than about 200° C.

35. The method of claim 20 for processing a mineral material, wherein:

said oxidative treating of said feed slurry comprises subjecting said feed slurry to an oxidizing environment at a temperature of greater than about 210° C.

36. The method of claim 20 for processing a mineral material, wherein:

said oxidative treating of said feed slurry comprises subjecting said feed slurry to an oxidizing environment at a temperature of greater than about 220° C.

37. The method of claim 20 for processing a mineral material, wherein:

the method further comprises separating said gold from said oxidized slurry and preparing a metal product comprising said precious metal.

38. The method of claim 37 for processing a mineral material, wherein:

said separating of said precious metal from said oxidized slurry comprises contacting said precious metal with a cyanide to form a complex of said precious metal with said cyanide.

39. A method for processing a gold-bearing mineral material, that is refractory due to the presence of both organic carbon and sulfide material, to liberate gold from the sulfide material and to deactivate, or passivate, the organic carbon present in the mineral material as an adsorbent capable of interfering with recovery of the gold, the method comprising the steps of:

(a) providing a feed slurry having particulate mineral material slurried with an aqueous liquid, wherein
  (i) said mineral material comprises gold; sulfide material, having sulfide sulfur, which is associated with said gold and from which said gold is difficult to separate to permit recovery of said gold; and organic carbonaceous material which is active as an adsorbent of a complex of said gold with a ligand and is capable of interfering with recovery of said gold, and
  (ii) at least 80 weight percent of particles of said mineral material in said feed slurry are smaller than 38 microns in size, which facilitates oxidative treating of said mineral material to reduce the ability of said organic carbonaceous material to interfere with recovery of said gold; and (b) oxidative treating of said mineral material comprising subjecting said feed slurry to an oxidizing environment at a temperature of greater than about 190° C., a total pressure of greater than about 190 psia, and an oxygen gas overpressure of greater than about 25 psig to produce an oxidized slurry having greater than about 10 grams of free acid per liter of liquid in said oxidized slurry, wherein during said oxidative treating at least 96 percent of sulfide sulfur in said feed slurry is oxidized, and organic carbon in said feed slurry is passivated as an adsorbent of said complex.

40. The method of claim 39 for processing a gold-bearing mineral material, wherein:

said oxidized slurry has greater than about 15 grams of free acid per liter of liquid in said oxidized slurry.

41. The method of claim 39 for processing a gold-bearing mineral material, wherein:

said mineral material comprises a blend of a first material having a carbonate mineral and at least one other material having sulfide sulfur such that said mineral material comprises sufficient sulfide sulfur to permit production of sufficient acid during said pressure oxidation to provide said free acid in said oxidized slurry.

42. The method of claim 40 for processing a gold-bearing mineral material, wherein:

said feed slurry comprises substantially no added acid prior to said pressure oxidation.

43. The method of claim 40 for processing a mineral material, wherein:

said oxidative treating of said mineral material comprises subjecting said feed slurry to an oxidizing environment at a temperature of greater than about 200° C., a total pressure of greater than about 250 psia and an oxygen gas overpressure of greater than about 25 psig.

44. The method of claim 40 for processing a mineral material, wherein:

said oxidative treating of said mineral material comprises subjecting said feed slurry to an oxidizing environment at a temperature of greater than about 220° C., a total pressure of greater than about 380 psia and an oxygen gas overpressure of greater than about 50 psig.

* * * * *